UNITED STATES PATENT OFFICE.

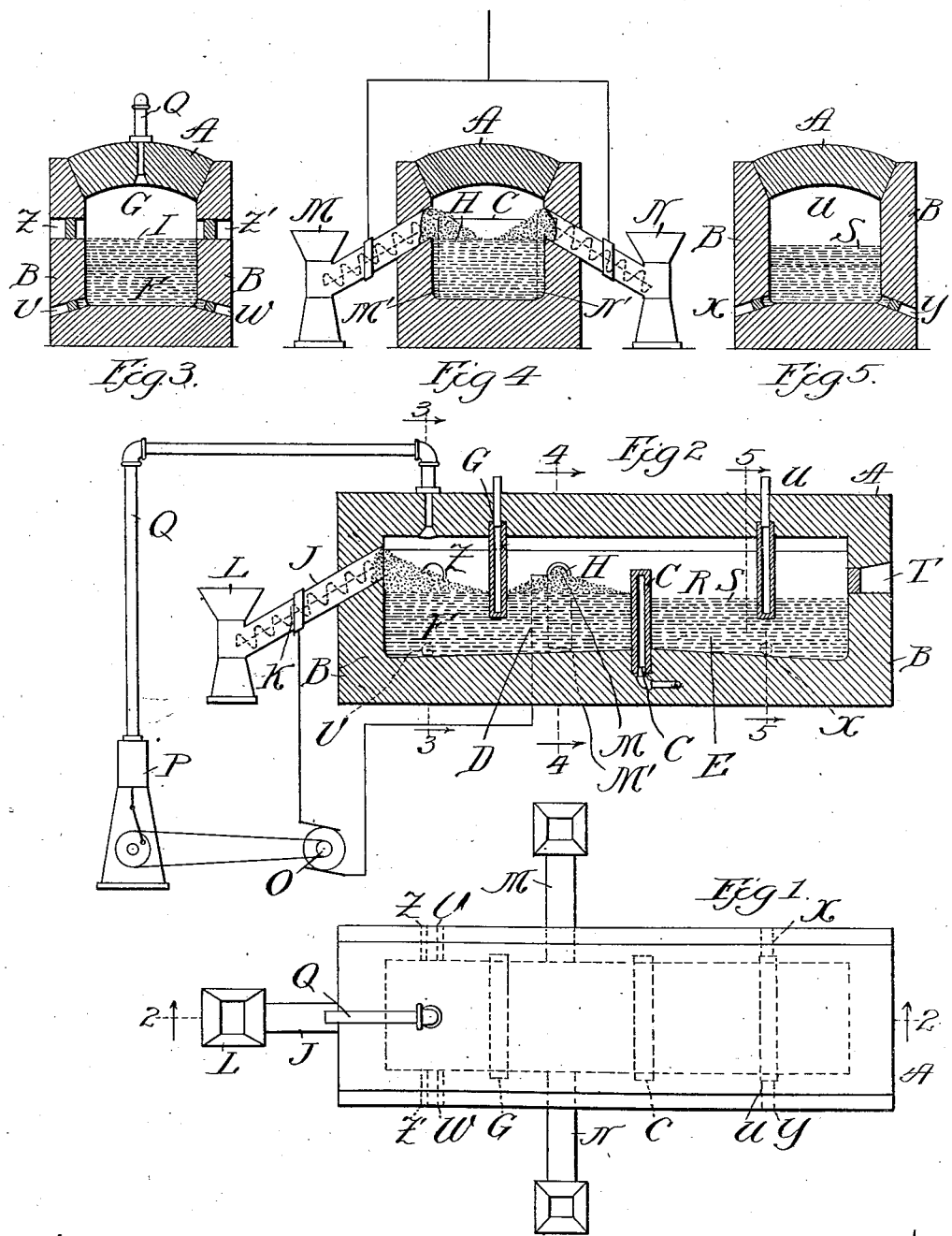

FREDERICK T. SNYDER, OF OAK PARK, ILLINOIS.

METALLURGICAL PROCESS.

No. 814,810.      Specification of Letters Patent.      Patented March 13, 1906.

Application filed June 23, 1905. Serial No. 266,540.

*To all whom it may concern:*

Be it known that I, FREDERICK T. SNYDER, a citizen of the United States, residing at Oak Park, in the county of Cook and State of Illinois, have invented a certain new and useful Improvement in Metallurgical Processes, of which the following is a full, clear, concise, and exact description.

My invention relates to a process of treating sulfid ores for the extraction of the metal in a simple, direct, and economical way, and involves also the formation of a sulfur-bearing compound as a by-product.

The present commercial method of reducing zinc-sulfid ores involves first roasting the ores to oxids and then reducing the roasted ore with crushed carbon in a retort by means of external heat, air being excluded from the retort. Under favorable conditions the zinc oxid is reduced and the metal liberated in the form of vapor, which is afterward collected and condensed. Zinc ores containing any considerable amount of slag-forming materials, however, cannot be commercially treated in this way, because the slag corrodes and eats through the walls of the retort. This is particularly true of a basic slag containing lime with iron, which takes up silica from the retort. The walls of the retort are necessarily thin to permit the passage of heat to the contents, and so are soon destroyed by the slag. Such ores cannot be smelted in a blast-furnace, because the zinc if reduced is immediately burned again to oxid by the blast.

In accordance with my invention the roasting may be dispensed with, and the sulfid ore is mixed with carbon and with slag-forming material and the mixture smelted upon a bath of molten slag in an electric furnace from which air is excluded, whereby the metallic sulfid is broken down, liberating the metal in a free state, and forming carbon bisulfid by the reaction of the sulfur and carbon. Preferably the electric current is passed directly through the body of molten slag formed in the furnace, in which a portion of the ore is dissolved, so that if direct current is used the reducing effect of the heated carbon will be augmented by the electrolytic action of the current upon the material in the fused bath, the metal being liberated at one electrode and carbon bisulfid being formed at the other electrode by the nascent sulfur combining with the carbon.

In the treatment of zinc-sulfid ore as above described the zinc is liberated in the form of vapor at the high temperature employed—about 1,000° or 1,200° centigrade—and may be collected and condensed apart from the carbon bisulfid. The condensation of the zinc-vapor also serves to separate it from any carbon bisulfid with which it may be diluted, because the latter will not condense except at a much lower temperature. As a result of electrolysis, however, the formation of carbon bisulfid will naturally take place at the anode by the combination of the nascent sulfur with the carbon, while the zinc-vapor will be liberated at the cathode, so that the two gases may be kept separate by suitable partitions in the furnace. In such case the zinc-vapor, being unaccompanied by any appreciative amount of diluting-gases, may be condensed in liquid form.

The success of this process has been experimentally demonstrated in the following manner: An electric furnace provided with carbon electrodes and closed to the air during operation was started by heaping scrap lead between the electrodes and melting down the lead by the passage of an electric current to form a fused bath. Slag-forming material consisting of the ore to be treated (in this case a zinc-blende) mixed with iron and lime as fluxes was then fed into the furnace and melted down to form a fused bath of slag, most of the lead being then tapped off and the operation continued by passing a current through the slag. By means of a current of fifteen hundred or eighteen hundred amperes at an electromotive force ranging from seven to fifteen volts the furnace was heated to about 1,200° centigrade, and under such conditions the ore was reduced, metallic zinc being liberated in the form of vapor near one electrode, while carbon bisulfid was formed near the other electrode. It is difficult to say to what extent the reduction of the sulfid is due to the electrolytic effect of the current as distinguished from the reducing action of the carbon at the high temperature employed, but electrolysis undoubtedly takes place, and I therefore prefer to employ direct instead of alternating current. The ore in question, as before stated was a zinc sulfid and contained approximately twenty per cent. of zinc, twenty per cent. of iron, five per cent. of lead, thirty-five per cent. of sulfur, and twenty per cent. of earths—silica and alumina.

In the ordinary method of zinc distillation with retorts, as previously described, only oxid or roasted ores of zinc are commercially used, and a considerable portion of the zinc—ten per cent. to twenty-five per cent. of the amount in the charge—remains unreduced in the residues and is lost. This loss is due largely to the fact that the reaction is incomplete, because the material in the retort cannot be melted down to form a slag. As before mentioned, the production of a slag would cause the destruction of the retort. In my process of reduction, on the other hand, the formation of slag is an essential feature, the materials of the charge being thoroughly melted down in a liquid or semiliquid state, so that in the presence of an excess of carbon the reduction of the zinc is very thorough, and the temperature is maintained at so high a degree that the reduced zinc is thoroughly boiled out of the slag and recovered. It is entirely possible by my process to recover ninety-four per cent. or more of the amount of zinc in the charge. Furthermore, it is not necessary in my process to roast the ore, although it should be understood in treating zinc ores that the presence of zinc oxid in the charge, whether it is present naturally in the ore or is formed as the result of partial roasting of the sulfid, will not interfere with the practice of my invention.

The production of carbon bisulfid, which has considerable commercial value, is a feature of my process and may be an important feature when the ore to be treated is high in sulfur. If desired, the carbon bisulfid may be put to immediate use to furnish the motive power for driving a gas-engine, which may be coupled with a dynamo furnishing current for the reduction process. In some cases, however, the carbon bisulfid produced can be commercially neglected, the profit being derived wholly from the metals recovered.

In the case of zinc ores the zinc is reduced in the form of vapor and may be collected in any well-known way. It may be burned to produce zinc-white; but preferably it is condensed and drawn from the condenser in a liquid form.

In the practice of the process herein described care should be taken to keep air from the inside of the furnace, which should be very substantial in construction and securely sealed during operation.

In order to secure proper condensation of the zinc in liquid form instead of in the form of zinc-dust, the zinc-vapor should be so far as possible free from diluting-gases. Where direct current is used and the production of carbon bisulfid can be confined to the neighborhood of one of the electrodes, the zinc-vapor liberated near the other electrode can be kept substantially undiluted. In this connection, however, it should be noted that in the reduction of the zinc from sulfid ores to produce carbon bisulfid the proportion of zinc-vapor relative to that of the other gas is very much higher than when oxid ores are reduced and carbon monoxid produced. This is due to the fact that the production of a given volume of carbon bisulfid involves the reduction of approximately twice the quantity of ore which is reduced in producing the same volume of carbon monoxid.

In the accompanying drawings I have illustrated one form of apparatus by which my invention may be practiced.

Figure 1 is a plan view of the furnace. Fig. 2 is a longitudinal sectional view thereof, showing also in diagram the electrical connections and an apparatus for utilizing the energy of the carbon bisulfid. Fig. 3 is a cross-sectional view on line 3 3 of Fig. 2. Fig. 4 is a cross-sectional view on line 4 4 of Fig. 2. Fig. 5 is a cross-sectional view on line 5 5 of Fig. 2.

The same letters of reference designate the same parts wherever they are shown.

The furnace A shown in the drawings is of a type adapted for the passage of electric current directly through a bath of fused material, such as slag, to produce an electrolytic decomposition of the ore which may be dissolved in said bath and also to produce a high degree of heat throughout the furnace. The walls B B, of refractory material, may be as thick as desired to withstand corrosion by the slag. The furnace is divided by a water-jacketed partition C into two chambers D and E, in one of which the ore is reduced, while the other serves as a condensing-chamber for the zinc-vapor. The reducing-chamber D is further divided by a water-jacketed partition G, extending downwardly from the roof of the chamber to a point below the surface of the molten material contained in said chamber. The electrodes by which current is conveyed to the slag-bath being located one on each side of said partition G, it will be seen that gases liberated at one electrode are thereby prevented from mingling with the gases liberated at the other electrode. The electrodes may be formed by bodies of the materials which are to make up the furnace charge, said materials being introduced into the furnace by feeders M, N, and L, which consist of tubes containing said materials, each tube having a rotatable worm or screw for advancing the material through the tube. Thus the feeder J is intended to supply carbon in the form of crushed coke to the interior of the furnace and forms the anode of the furnace, while the zinc-sulfid ore to be treated, preferably mixed with crushed coke, is supplied by the feeders M and N to form cathode-terminals of the furnace. The electrodes formed by the zinc sulfids may be supplemented by extensions of electrodes M' N' of solid carbon extending down well into the bath of molten materials.

In the diagram, Fig. 2, a dynamo O is illustrated for supplying electric current to the furnace, one terminal of said dynamo being connected to the electrode J, while the other terminal thereof is connected to electrodes M N M' N'. The dynamo is illustrated in the diagram as being driven by a gas-engine P, which is supplied through pipe Q with carbon-bisulfid gas for its operation from the chamber F of the furnace. It is understood, of course, that the electric current may be furnished from any suitable source instead of in the manner indicated.

The furnace is provided with suitable taps for removing the various products of reduction. In the drawings openings Z Z' are shown near the top of the chamber D for removing any accretions which may be formed at the surface of the bath of molten mineral, and near the bottom of said chamber P taps V and W are provided for removing the heavier materials, such as molten lead, which may settle out below the slag. So the zinc-condensing chamber E is shown to be provided with a tap-hole T, through which the molten zinc may be removed from time to time, and tap-holes X and Y are also provided near the bottom of said chamber E for removing the heavier impurities which may settle out from the molten zinc. In case the ore under treatment contains lead, for example, in addition to zinc, some of the lead may be volatilized and carried over with the zinc to the condensing-chamber E. This lead will settle at the bottom of the chamber and may be removed at the taps X and Y.

The condensing-chamber E is divided by a water-jacketed partition U, which extends downwardly from the roof of the chamber to a point below the level of the molten zinc contained therein and serves to prevent the admission of air from the tap-hole to the portion of said chamber which receives the vaporized zinc.

In the particular form of furnace illustrated the operation is as follows: The feeders M N being supplied with quantities of the sulfid ore to be treated, mixed with crushed coke and slag-forming materials, and the feeder J being likewise supplied with a quantity of crushed coke, the electric current from generator O is passed through the molten slag F by way of the material in said feeders which serve as electrodes. The current should be sufficient to maintain a temperature in the slag well above the volatilization-point of zinc—that is to say, a temperature from 1,000° to 1,200° centigrade or more. Under these conditions the materials of the charge will be reduced, metallic zinc being liberated in the form of vapor, which will pass over the top of partition C into the condensing-chamber, while the sulfur unites with the carbon to form carbon bisulfid, which is conveyed by pipe Q to furnish power for the engine P. The condensing-chamber E being close to the reducing-chamber and inclosed by the same furnace-walls will be maintained at a high temperature, so that under otherwise favorable conditions the zinc-vapor may be condensed in liquid form and drawn off at the tap T. Any lead which is present is also reduced in the smelting and collects at the bottom of the chamber D under the slag-bath, where it may be tapped off at V and W. If lead-vapor is carried over with the zinc into the chamber E, it will also be condensed and will settle at the bottom of said chamber, where it may be tapped off at X and Y. The slag which is formed as the result of smelting adds to the molten bath F, the excess being removed from time to time at Z and Z'.

It will be apparent that my invention may be practiced by means of apparatus differing widely from the specific form which is here shown for purposes of illustration.

I claim—

1. The herein-described process of treating sulfid ore which consists in dissolving the same in a fused-mineral bath, and subjecting the mixture to the action of an electric current in the presence of carbon, at a high temperature, the sulfid being broken down, the metal thereof liberated and carbon bisulfid formed at the same time by the reaction of the sulfur and carbon.

2. The process of treating zinc ore containing sulfur which consists in mixing said ore with carbon and with slag-forming materials and smelting the mixture upon a bath of molten slag in the absence of air by electrically maintaining in the slag a temperature above the volatilization-point of zinc, thereby producing zinc-vapor and a sulfur-bearing compound.

3. The process of treating sulfid ore, which consists in smelting said ore with crushed carbon and slag-forming materials upon a slag-bath in a furnace in which heat is developed internally by the passage of an electric current, thereby breaking down the sulfid, liberating the metal and forming carbon bisulfid by the reaction of the carbon and sulfur.

4. The process of treating zinc-sulfid ore which consists in feeding said ore in contact with a bath of molten slag in an electric furnace from which air is excluded, and there reducing said ore with carbon and slag-forming materials, by passing an electric current through said slag sufficient to maintain a temperature above the volatilization-point of zinc, thereby liberating the zinc as metallic vapor and at the same time forming carbon bisulfid by the reaction of the sulfur and carbon, condensing and collecting the zinc-vapor and isolating and collecting the carbon bisulfid.

5. The process of treating zinc-sulfid ore which consists in heating said ore with carbon, above the volatilization temperature of zinc, in an electric furnace from which air is excluded, thereby liberating the zinc as metallic vapor and forming carbon bisulfid by the reaction of the sulfur with the carbon, condensing and collecting the zinc-vapor and isolating and collecting the carbon bisulfid.

6. The process of treating zinc-sulfid ore which consists in feeding said ore into contact with a bath of molten slag in an electric furnace, and there reducing said ore with carbon and slag-forming materials, by passing an electric current through said slag sufficient to maintain a temperature above the volatilization-point of zinc, thereby liberating the zinc and at the same time forming carbon bisulfid by the reaction of the sulfur and carbon.

7. The process of treating zinc sulfids, which consists in electrolyzing said sulfid in a fused mineral electrolyte, thereby liberating zinc at one electrode and sulfur at a second electrode, said second electrode being formed of carbon, whereby sulfur combines with the carbon of the electrode to form carbon bisulfid, and separately collecting said zinc and said carbon bisulfid in the absence of air.

8. The process of treating zinc sulfid, which consists in electrolyzing said zinc sulfid in a fused mineral electrolyte at a temperature such that volatile zinc is liberated at one electrode and sulfur is liberated at a second electrode, the second electrode being formed of carbon, whereby the carbon and liberated sulfur combine to form carbon bisulfid, and collecting without intermingling the liberated zinc and the carbon bisulfid.

9. The process of treating zinc sulfid, which consists in treating said zinc sulfid with a fused mineral electrolyte in the presence of carbon, by the passage of an electric current, thereby producing a temperature such that volatile zinc and sulfur are liberated, whereby the carbon and liberated sulfur combine to form carbon bisulfid, collecting the liberated zinc and carbon bisulfid, conveying said liberated carbon bisulfid to an engine and there combining said carbon bisulfid with oxygen to develop mechanical power.

10. The process of treating zinc sulfid, which consists in electrolyzing said zinc sulfid in a fused mineral electrolyte at a temperature such that volatile zinc is liberated at one electrode and sulfur is liberated at a second electrode, the second electrode being formed of carbon, whereby the carbon and liberated sulfur combine to form carbon bisulfid, collecting without intermingling the liberated zinc and carbon bisulfid, thereafter condensing the collected volatile zinc, conveying said liberated carbon bisulfid to an engine, there combining said carbon bisulfid with oxygen to develop mechanical power and causing said power to drive an electric generator supplying current for said electrolysis.

11. The process of electrolyzing fused zinc sulfid at a temperature such that volatile zinc is liberated at one electrode and sulfur is liberated at a second electrode, said second electrode being formed of carbon, whereby the carbon and liberated sulfur combine to form carbon bisulfid, and collecting without intermingling the liberated zinc and carbon bisulfid.

12. The process of electrolyzing fused zinc sulfid at a temperature such that volatile zinc is liberated at one electrode and sulfur is liberated at a second electrode, the second electrode being formed of carbon, whereby the carbon and liberated sulfur combine to form carbon bisulfid, collecting without intermingling the liberated zinc and the carbon bisulfid, thereafter condensing the collected volatile zinc, conveying said liberated carbon bisulfid to an engine, and there combining said carbon bisulfid with oxygen to develop mechanical power.

In witness whereof I hereunto subscribe my name this 21st day of June, A. D. 1905.

FREDERICK T. SNYDER.

Witnesses:
DE WITT C. TANNER,
IRVING MACDONALD.